(12) United States Patent
Judd et al.

(10) Patent No.: US 10,102,754 B2
(45) Date of Patent: Oct. 16, 2018

(54) SYSTEMS AND METHODS FOR MANAGING CONTROLLER PILOT DATA LINK COMMUNICATION (CPDLC) SYSTEMS

(75) Inventors: Thomas D. Judd, Woodinville, WA (US); John Vise, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 13/268,284

(22) Filed: Oct. 7, 2011

(65) Prior Publication Data

US 2013/0090786 A1 Apr. 11, 2013

(51) Int. Cl.
*G08G 5/00* (2006.01)
*H04L 29/08* (2006.01)

(52) U.S. Cl.
CPC ........... *G08G 5/0013* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 6,313,759 B1 | 11/2001 | Musland-Sipper | |
| 6,353,779 B1 | 3/2002 | Simon | |
| 6,946,976 B1 | 9/2005 | Langner et al. | |
| 7,495,602 B2 * | 2/2009 | Sandell | G08G 5/0013 342/37 |
| 7,647,139 B2 | 1/2010 | Sandell | |
| 7,835,316 B2 | 11/2010 | McGuffin et al. | |
| 7,860,642 B2 | 12/2010 | Sandell et al. | |

(Continued)

FOREIGN PATENT DOCUMENTS

| | | |
|---|---|---|
| EP | 2109087 | 10/2009 |
| EP | 2337000 | 6/2011 |

(Continued)

OTHER PUBLICATIONS

Condis, "Standards for Seamless ATS Communications Transition Between Different Datalink Technologies", Mar. 19, 2010, pp. 1-7

(Continued)

*Primary Examiner* — Jonathan M Dager
*Assistant Examiner* — Garrett F Evans
(74) *Attorney, Agent, or Firm* — Fogg & Powers LLC

(57) ABSTRACT

Systems and methods for a non-integrated CPDLC solution are provided. In one embodiment, the system includes: a first and second computing system for respectively executing a first and second CPDLC application; a Human Machine Interface coupled to the first and second computing systems, the Human Machine Interface providing access to display screens generated by both the first and second CPDLC applications; and a data authority function that determines a data authority application from the first and second CPDLC applications based on which of the first and second CPDLC applications has a current data authority (CDA) session. The data authority function prevents the first CPDLC application from establishing a concurrent current data authority session when the second CPDLC application is the data authority application. The data authority function prevents the second CPDLC application from establishing a concurrent current data authority session when the first CPDLC application is the data authority application.

18 Claims, 7 Drawing Sheets

(56) References Cited

U.S. PATENT DOCUMENTS

| | | | |
|---|---|---|---|
| 8,244,452 | B2 | 8/2012 | Judd et al. |
| 2007/0126621 | A1 | 6/2007 | Sandell et al. |
| 2007/0129854 | A1 | 6/2007 | Sandell et al. |
| 2008/0098307 | A1* | 4/2008 | Corbefin .................. G06F 3/14 715/733 |
| 2008/0163093 | A1* | 7/2008 | Lorido .................. G01C 23/00 715/771 |
| 2008/0208399 | A1 | 8/2008 | Pham |
| 2009/0117895 | A1 | 5/2009 | McGuffin |
| 2009/0258643 | A1 | 10/2009 | McGuffin |
| 2010/0023247 | A1* | 1/2010 | Sandell ................ G08G 5/0013 701/120 |
| 2011/0133980 | A1 | 6/2011 | Judd et al. |
| 2012/0078494 | A1 | 3/2012 | Judd et al. |
| 2014/0372018 | A1 | 12/2014 | Srinivasan et al. |

FOREIGN PATENT DOCUMENTS

| | | |
|---|---|---|
| EP | 2439899 | 4/2012 |
| WO | 2007064733 | 6/2007 |

OTHER PUBLICATIONS

Sandell, "ATN Datalink on Boeing Airplanes", "Link 2000+ Incentives Workshop", Oct. 10-Nov. 2007, pp. 1-15, Publisher: The Boeing Company.

Sandell, "Datalink on the 787 Airplane", "ATN 2005", Sep. 20, 2005, pp. 1-42, Publisher: The Boeing Company, Published in: London.

"PM-CPDLC Validation Report", Apr. 29, 2005, pp. 1-12, Publisher: Aeronautical Communications Panel—Working Group N.

Bousquie, Jean-Francois, "Data Link Communications: Operational & Human Factors Considerations", "Proceedings of Digital Avionics Systems Conference", Nov. 1999, pp. 5.C.4-1 thru 5.C.4-8, Publisher: IEEE, Published in: St. Louis, MO.

Judd et al, "Systems and Methods for Managing Non-Integrated Controller Pilot Data Link Communications (CPDLC) Systems on an Aircraft", "U.S. Appl. No. 12/888,499, filed Sep. 23, 2010".

European Patent Office, "Office Action", "from Foreign Counterpart of U.S. Appl. No. 12/633,918", dated Jul. 28, 2011, pp. 1-5, Published in: EP.

European Patent Office, "Extended European Search Report", "from Foreign Counterpart of U.S. Appl. No. 12/633,918", dated Mar. 11, 2011, pp. 1-7, Published in: EP.

U.S. Patent and Trademark Office, "Notice of Allowance", "U.S. Appl. No. 12/633,918", dated May 25, 2012, pp. 1-8.

U.S. Patent and Trademark Office, "Office Action", "U.S. Appl. No. 12/633,918", dated Jan. 11, 2012, pp. 1-22.

European Patent Office, "Office Action", "from Foreign Counterpart of U.S. Appl. No. 12/888,499", dated Apr. 16, 2012, pp. 1-3, Published in: EP.

European Patent Office, "European Search Report", "from Foreign Counterpart of U.S. Appl. No. 12/888,499", dated Mar. 22, 2012, pp. 1-3, Published in: EP.

European Patent Office, "Office Action", "from Foreign Counterpart of U.S. Appl. No. 13/268,284", dated Mar. 15, 2013, pp. 1-5, Published in: EP.

European Patent Office, "European Search Report", "from Foreign Counterpart of U.S. Appl. No. 13/268,284", dated Mar. 4, 2013, pp. 1-4, Published in: EP.

U.S. Patent and Trademark Office, "Office Action", "U.S. Appl. No. 12/888,499", dated May 17, 2013, pp. 1-35.

U.S. Patent and Trademark Office, "Advisory Action", "from U.S. Appl. No. 12/888,499", dated Nov. 29, 2013, pp. 1-3, Published in: US.

U.S. Patent and Trademark Office, "Office Action", "from U.S. Appl. No. 12/888,499", dated Feb. 20, 2014, pp. 1-22, Published in: US.

United States Patent and Trademark Office, "Office Action for U.S. Appl. No. 12/888,499", dated Oct. 9, 2014, pp. 1-26, Published in: US.

U.S. Patent and Trademark Office, "Advisory Action", "U.S. Appl. No. 12/888,499", dated Sep. 8, 2014, pp. 1-3, Published in: US.

The United States Patent Office, "Final Office Action", "U.S. Appl. No. 12/888,499", dated Jun. 30, 2014, pp. 1-31, Published in: US.

European Patent Office, "Office Action for Application Serial No. 12187027.3", "from Foreign Counterpart of U.S. Appl. No. 13/268,284", dated Dec. 8, 2014, pp. 1-5, Published in: EP.

U.S. Patent Office, "Advisory Action", "from U.S. Appl. No. 12/888,499", dated May 13, 2015, pp. 1-7, Published in: US.

U.S. Patent and Trademark Office, "Examiner's Answer", "U.S. Appl. No. 12/888,499", dated Oct. 22, 2015, pp. 1-8.

U.S. Patent Office, "Final Office Action for U.S. Appl. No. 12/888,499", dated Mar. 4, 2015, pp. 1-19, Published in: US.

U.S. Patent and Trademark Office, "Pre-Appeal Brief Decision", "U.S. Appl. No. 13/765,951", Oct. 15, 2015, pp. 1-2.

State Intellectual Property Office, P.R. China, "First Office Action from CN Application No. 201210415176.4 dated Nov. 2, 2015", "from Foreign Counterpart od U.S. Appl. No. 13/268,284", dated Nov. 2, 2015, pp. 1-19, Published in: CN.

U.S. Patent and Trademark Office, "Decision on Appeal", "U.S. Appl. No. 12/888,499", dated Oct. 20, 2017, pp. 1-7, Published in: US.

U.S. Patent and Trademark Office, "Notice of Allowance", "U.S. Appl. No. 13/765,951", dated Nov. 6, 2017, pp. 1-9, Published in: US.

U.S. Patent and Trademark Office, "Examiner's Answer", "U.S. Appl. No. 13/765,951", dated Apr. 27, 2016.

State Intellectual Property Office for People's Republic of China, "Notification to Grant Patent Right for Invention for CN Application No. 201110340699.2", "Foreign Counterpart to U.S. Appl. No. 12/888,499", dated May 31, 2017, pp. 1-5, Published in: CN.

State Intellectual Property Office, P.R. China, "Office Action from CN Applicantion No. 201110340699.2 dated Mar. 25, 2016", "Foreign Counterpart to U.S. Appl. No. 12/888,499", , pp. 1-12, Published in: CN.

State Intellectual Property Office, P.R. China, "Office Action from CN Application No. 201110340699.2 dated Aug. 11, 2016", "from Foreign Counterpart of U.S. Appl. No. 12/888,499", dated Aug. 11, 2016, pp. 1-15, Published in: CN.

State Intellectual Property Office, P.R. China, "Office Action from CN Application 201110340699.2, 'dated Jan. 20, 2017", "from Foreign Counterpart of U.S. Appl. No. 12/888,499", dated Jan. 20, 2017, pp. 1-16, Published in: CN.

State Intellectual Property Office of People's Republic of China, "Notification to Grant Patent Right for Invention for CN Application No. 201210415176.4", "Foreign Counterpart to U.S. Appl. No. 13/268,284", dated Dec. 20, 2016, pp. 1-5, Published in: CN.

State Intellectual Property Office for People's Republic of China, "Second Office Action for CN Application No. 201210415176.4", "Foreign Counterpart to U.S. Appl. No. 13/268,284", dated Jul. 6, 2016, pp. 1-12, Published in: CN.

United States Patent and Trademark Office, "Advisory Action", "U.S. Appl. No. 13/765,951", dated Aug. 19, 2015, pp. 1-3.

United States Patent and Trademark Office, "Decision on Appeal", "From U.S. Appl. No. 13/765,951", dated Sep. 29, 2017, pp. 1-8, Published in: US.

United States Patent and Trademark Office, "Final Office Action", "from U.S. Appl. No. 13/765,951", dated May 29, 2015, pp. 1-18, Published in: US.

United States Patent and Trademark Office, "Office Action", "From U.S. Appl. No. 13/765,951", dated Jan. 6, 2015, pp. 1-21, Published in: US.

U.S. Patent and Trademark Office, "Notice of Allowance for U.S. Appl. No. 13/765,951", dated Apr. 18, 2018, pp. 1-18, Published in: US.

United States Patent and Trademark Office, "Office Action for U.S. Appl. No. 12/888,499", dated Feb. 9, 2018, pp. 1-32, Published in: US.

* cited by examiner

SYSTEMS AND METHODS FOR MANAGING CONTROLLER PILOT DATA LINK COMMUNICATION (CPDLC) SYSTEMS

BACKGROUND

Two different systems for implementing Controller Pilot Data Link Communications (CPDLC) for air traffic control are available for commercial aircraft today. The first CPDLC system is referred to as the Future Air Navigation System (FANS), or FANS CPDLC. FANS based applications are typically implemented on an aircraft's Flight Management Computer (FMC), also referred to as the Flight Management System (FMS), and communicate with air traffic control (ATC) stations using text based messages communicated over the Aircraft Communications Addressing and Reporting System (ACARS). The second CPDLC system is implemented over the Aeronautical Telecommunication Network (ATN) via an aircraft's Communication Management Unit (CMU), also referred to as the Communication Management Function (CMF). The CPDLC system implemented over the ATN via a CMF is commonly referred to as an ATN CPDLC. Use of FANS CPDLC versus ATN CPDLC on an aircraft is largely based on geographical considerations such that an aircraft that travels from a FANS CPDLC region to an ATN CPDLC region would greatly benefit from being able to support both CPDLC systems.

There are problems that arise however when fully independent FANS CPDLC and ATN CPDLC systems are available to an aircraft's flight crew. FANS and ATN CPDLC systems share "alerting" approaches when a CPDLC message is received from a ground controller. In cases where the CMF supports an ATN CPDLC application and the FMC independently supports a FANS CPDLC application, members of the flight crew may become confused as to which system to access after getting a CPDLC alert. Also, with non-integrated systems, it is potentially possible to establish two different CPDLC sessions using the different CPDLC systems at the same time and designate the two different ATC centers associated with the CPDLC sessions as current data authorities (CDAs). This presents a potentially dangerous situation. To avoid the dangers posed by having two current data authorities, some regulations prohibit having different ATC centers simultaneously functioning as current data authorities. Such a configuration may further face regulatory certification issues if not resolved and could also create training and flight work-load issues.

For the reasons stated above and for other reasons stated below which will become apparent to those skilled in the art upon reading and understanding the specification, there is a need in the art for improved systems and methods for managing non-integrated CPDLC systems on a single aircraft.

SUMMARY

The embodiments of the present invention provide methods and systems for managing non-integrated CPDLC systems on a single aircraft and will be understood by reading and studying the following specification.

Systems and methods for a non-integrated CPDLC solution are provided. In one embodiment, the system includes: a first computing system executing a first CPDLC application; a second computing system executing a second CPDLC application; at least one Human Machine Interface coupled to the first computing system and the second computing system, the Human Machine Interface providing access to display screens generated by both the first CPDLC application and the second CPDLC application; and a data authority function that determines a data authority application from one of the first CPDLC application and the second CPDLC application based on which of the first CPDLC application and the second CPDLC application has a current data authority session. The data authority function prevents the first CPDLC application from establishing a concurrent current data authority session when the second CPDLC application is the data authority application. The data authority function prevents the second CPDLC application from establishing a concurrent current data authority session when the first CPDLC application is the data authority application.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention address the need for managing non-integrated CPDLC systems on a single aircraft by providing a system interface that allows a user to establish multiple CPDLC sessions. Further, the system allows the user to designate only one of the air traffic controllers associated with the established CPDLC sessions as the current data authority and prevents the user from communicating with an air traffic controller that is not the current data authority. Thus, the system allows a user to establish CPDLC sessions with different types of CPDLC systems while preserving safe communications between the user and air traffic controllers.

Figure 1:
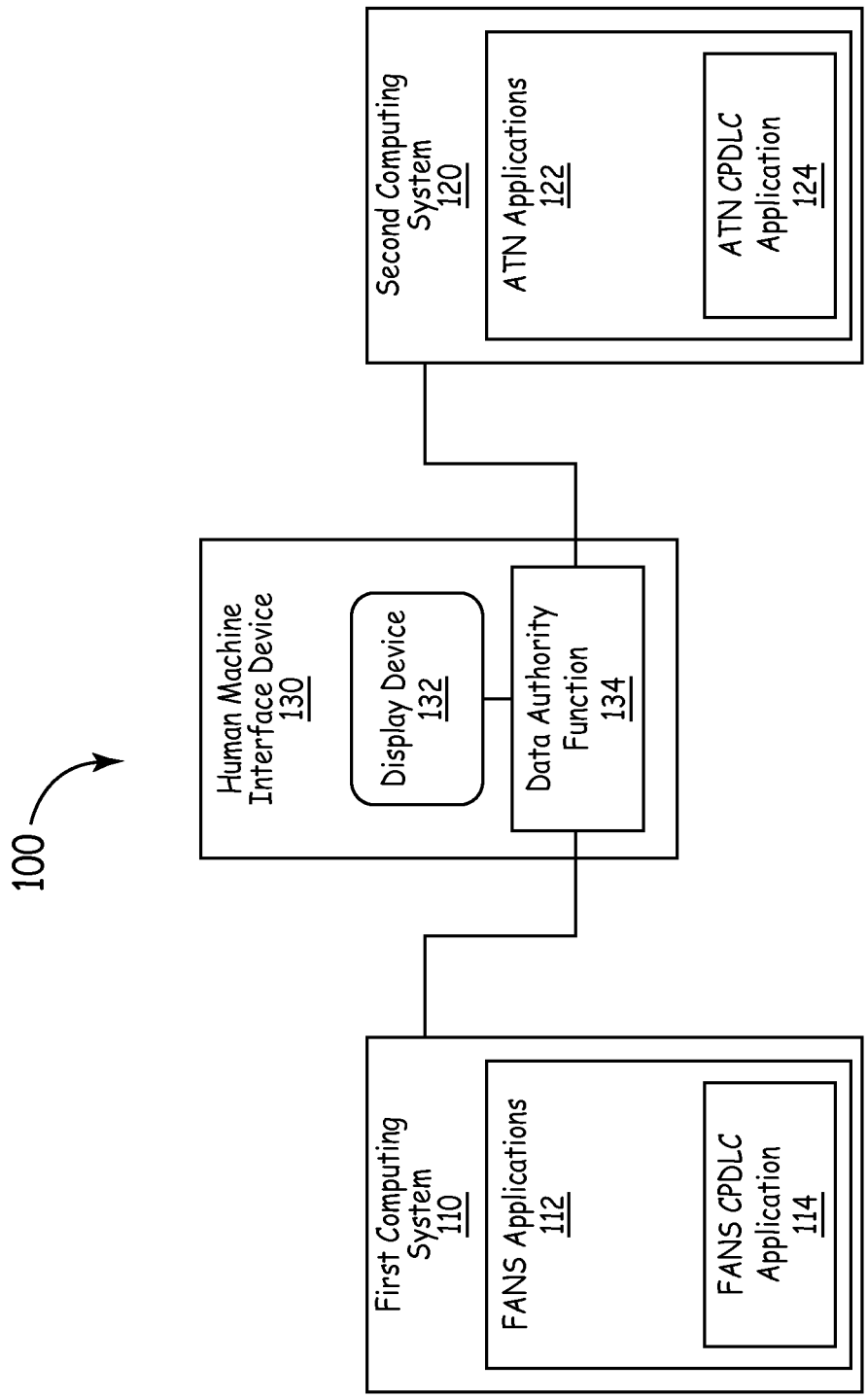
FIG. 1 is a block diagram of a system for implementing a non-integrated FANS/ATN CPDLC solution of one embodiment of the present invention.

FIG. 1 is a block diagram of a system 100 for implementing a non-integrated FANS/ATN CPDLC solution of one embodiment of the present invention. System 100 includes a first computing system 110 for executing one or more FANS applications 112 including a FANS CPDLC application 114, a second computing system 120 for executing one or more ATN applications 122 including an ATN CPDLC application 124, and at least one Human Machine Interface (HMI) 130 coupled to the first computing system 110 and the second computing system 120. As used in this specification herein, the terms "non-integrated" or "not integrated" mean that first computing system 110 implementing FANS applications 112 and second computing system 120 implementing ATN applications 122 are separate hardware elements. In some implementations, where first computing system 110 and second computing system 120 are not integrated, both computing systems have access to commonly used peripheral devices within the aircraft (e.g. audible alarm devices, human machine interfaces, wireless communication radios) and both send and receive data over a shared on-board data network.

Figure 2:
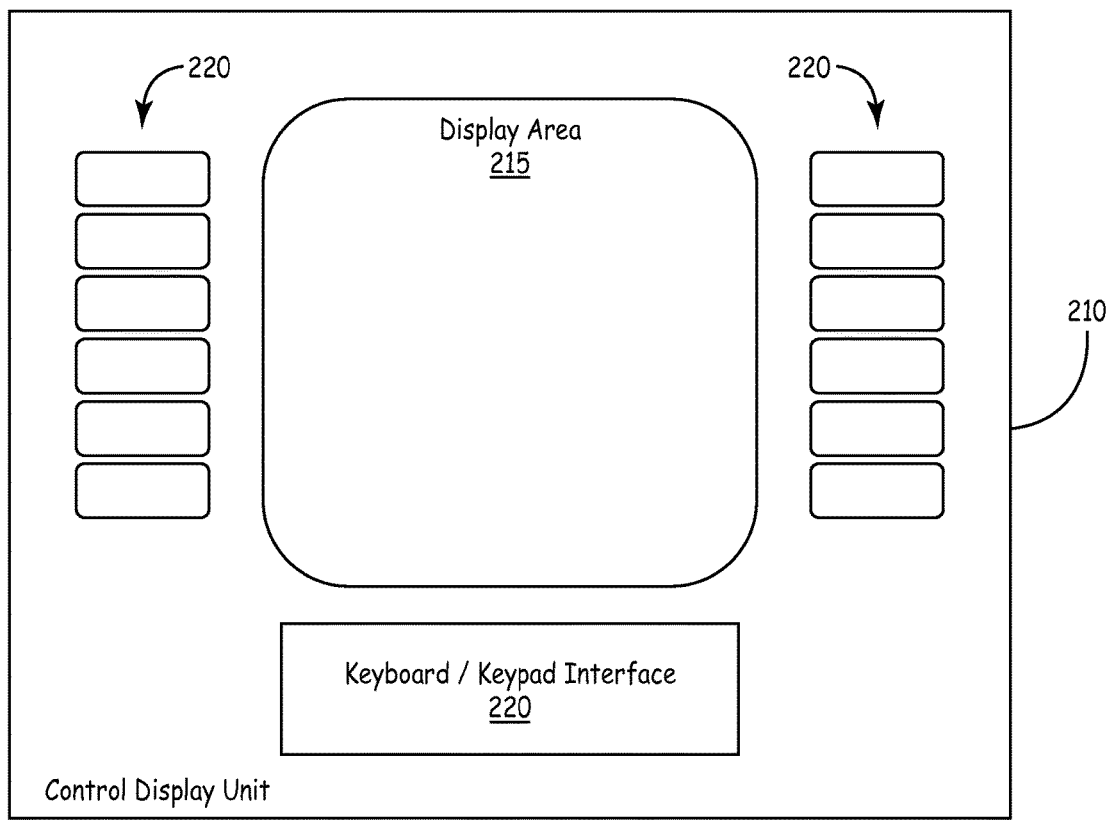
FIG. 2 is a block diagram of a control display unit (CDU) for a human Machine interface of one embodiment of the present invention.

Human machine interface 130 includes a display device 132 for displaying screens generated by FANS and ATN CPDLC applications 114 and 124. Also, display device 132 provides a way for a user to interact with human machine interface 130. In some embodiments, a user, like a flight crew member, using display device 132, is able to select forwarded fields on a screen using a cursor controlled interface, such as a multifunction display. In another embodiment, the user controls the screens on display device 132 using a multipurpose control display unit, such as shown in FIG. 2. FIG. 2 illustrates a control display unit 210 for controlling human machine interface 130 that includes a display area 215, a plurality of programmable buttons 220 on either side of the display area 215, and a keyboard interface 220. In yet other embodiments, the display device 132 provides aspects of both a multifunction display and a multipurpose control display unit (MCDU) to interface with the user.

In the embodiment of FIG. 1, a user accesses CPDLC screens through human machine interface 130, where the human machine interface 130 receives the CPDLC screens from FANS applications 112 and ATN applications 122. A flight crew user, such as an aircraft's pilot, for example, accesses some of the screens to log on to and establish multiple CPDLC sessions. For example, a flight crew user logs on to a screen generated by FANS applications 112 and establishes a CPDLC session with a FANS enabled air traffic controller. Soon thereafter and while the CPDLC session with the FANS air traffic controller is established, the flight crew user logs on to a screen generated by ATN applications 122 and establishes a second CPDLC session with an ATN enabled air traffic controller. Further, a user can access other screens on human machine interface 130, where the screens are provided by FANS applications 112 and ATN applications 122.

In certain embodiments, human machine interface 130 only allows one current data authority to be established at a time. While a user is able to establish multiple CPDLC sessions through human machine interface 130, the human machine interface 130 only allows the user to designate one of the air traffic controllers associated with a CPDLC session as a current data authority. To prevent the user from establishing multiple concurrent current data authority sessions, human machine interface 130 includes a data authority function 134. Data authority function 134 keeps track of whether FANS CPDLC applications 114 or ATN CPDLC application 124 is in communication with an ATC station designated by the user as the current data authority. The CPDLC application that is in communication with the current data authority is referred to herein as the designated data authority application.

In certain embodiments, data authority function 134 allows a user to designate which CPDLC session is the data authority application. After a user logs on to multiple CPDLC sessions, human machine interface 130 provides an interface through display device 132 requesting that the user select one of the multiple CPDLC sessions to function as the designated data authority application. Upon the selection, data authority function 134 notifies the air traffic controller associated with the designated data authority application that it is the current data authority. For example, when a user establishes CPDLC sessions with both FANS CPDLC application 114 and ATN CPDLC application 124, human machine interface 130 requests that the user designate one of FANS CPDLC application 114 and ATN CPDLC application 124 as the data authority application. In another example, where the user designates ATN CPDLC application 124 as the data authority application, an air traffic controller initiates a CPDLC session through ATN applications 122 and ATN applications 122 sends a CDA downlink to the air traffic controller and ATN applications 122 send a current data authority downlink to the air traffic controller to establish the current data authority session. When the CPDLC session is established between the air traffic controller and ATN applications 122, data authority function 134 distinguishes the CPDLC session between the air traffic controller and ATN applications 122 as the current data authority session.

In an alternative embodiment, when the user establishes multiple CPDLC sessions, data authority function 134 selects one of the established CPDLC sessions to function as the data authority application without receiving input from the user. For example, in one implementation, data authority function 134 selects the CPDLC application associated with the CPDLC session established first from the ground. For example, if a CPDLC session is established between an air traffic controller and FANS applications 112 before a CPDLC session is established between an air traffic controller and ATN applications 122, data authority function 134 designates the CPDLC session between the air traffic controller and FANS application 112 as the data authority application. In an alternative implementation, the data authority function 134 designates a data authority application according to characteristics of the aircraft and the links available to air traffic controllers. Characteristics include link quality, equipment quality, user preference, and the like.

When data authority function 134 designates a CPDLC session as a data authority application, data authority function 134 prevents the non-designated CPDLC sessions from establishing a concurrent current data authority session with an air traffic controller. For example, in certain embodiments, if data authority function 134 designates FANS CPDLC application 114 as the data authority application, data authority function 134 designates ATN CPDLC application 124 as a stand-by data authority application. Because ATN CPDLC application 124 is a stand-by data authority application, data authority function 134 will prevent the user, ATN CPDLC application 124, or air traffic controller from establishing the air traffic controller as a concurrent current data authority. To prevent the establishment of a concurrent current data authority session over a stand-by data authority application, data authority function 134 limits the availability of screens from the stand-by data authority application, prevents the transmission of messages to an air traffic controller, and responds to messages from air traffic controllers by indicating that the air traffic controller is not the current data authority.

Data authority function 134 receives screens from the multiple connected computing systems and directs display device 132 to display the screens to the user, where the screens aid the user in communicating with an air traffic controller designated as the current data authority. When a CPDLC application is the stand-by data authority application, data authority function 134 prevents the user from accessing screens from the stand-by data authority application to prevent the user from communicating with the stand-by data authority air traffic controller. When a CPDLC session is established through the stand-by data authority application, data authority function 134 allows the user to view a screen that indicates that an established CPDLC session is not a CPDLC session with a current data authority. In some implementations, a data authority function 134 allows a user to view screens but prevents the user from using the screens to send commands through the stand-by data authority application.

In certain embodiments, data authority function 134 prevents a stand-by data authority application from sending messages to an air traffic controller. In some implementations, when a CPDLC session is established, the air traffic controller assumes that they are the current data authority if the air traffic controller receives messages from a CPDLC application. To prevent the air traffic controller associated with a stand-by data authority application from assuming that the air traffic controller is the current data authority, data authority function 134 prevents the stand-by data authority application from creating messages and transmitting the messages to an air traffic controller. At times, however, the stand-by data authority application receives unsolicited messages from an associated air traffic controller. When the stand-by data authority application receives these messages from an air traffic controller, data authority function 134 directs the stand-by data authority application to transmit a message to the air traffic controller indicating that the air traffic controller is not the current data authority. For example, the stand-by data authority application transmits a "NOT CDA" message to the air traffic controller. Thus, data authority function 134 prevents the stand-by data authority application from establishing a current data authority session with an ATC center.

In further embodiments, data authority function 134 designates the stand-by data authority application as the next data authority application. Data authority function 134 changes the next data authority application to the data authority application if the link between the current data authority application and the current data authority ends and there is no next data authority connection with the current data authority application, and the stand-by data authority application has an established CPDLC session. For example, when FANS CPDLC application 114 is the current data authority application, data authority function 134 designates ATN CPDLC application 124 as the next data authority application when there is no next data authority CPDLC session already established through the current data authority application. Thus, when the CPDLC session between FANS CPDLC application 114 and the current data authority terminates and there are no next data authority CPDLC sessions available through FANS CPDLC application 114, data authority function 134 will set ATN CPDLC application 124 as the data authority application. Further, data authority function 134 designates the air traffic controller associated with ATN CPDLC application 124 as the current data authority. When data authority function 134 changes a stand-by data authority application into a data authority application, data authority function 134 instructs the new data authority application to send any current data authority downlink messages to the associated ATC center, which include messages that indicate to the ATC center that the ATC center is now the current data authority. Further, data authority function 134 allows the new data authority application to receive and process received uplinks from the newly designated current data authority. Also, data authority function 134 allows users to send messages to the current data authority through the new data authority application.

Figure 3A:
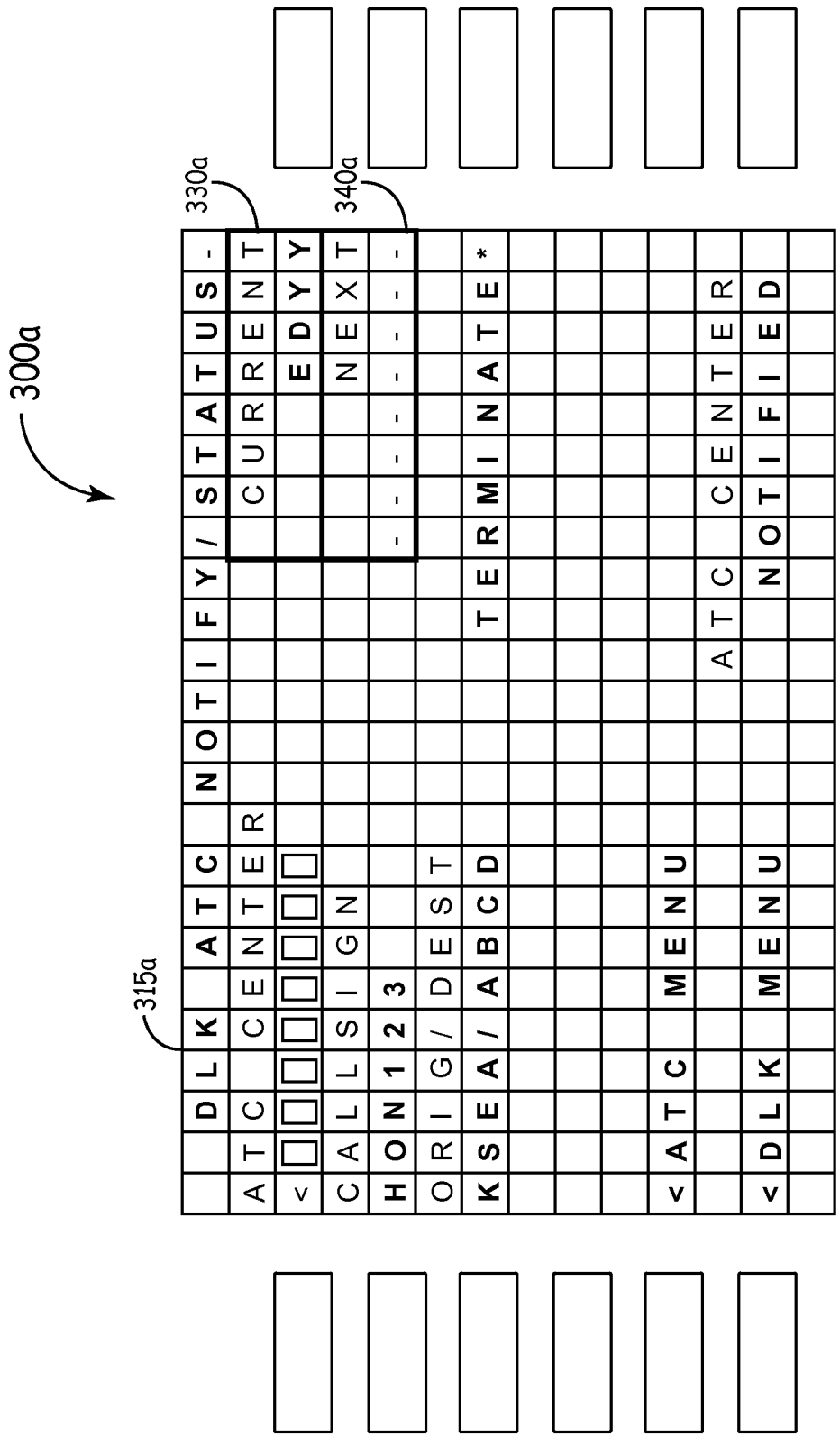
FIG. 3a-3c are block diagrams of displays of notification pages on the CDU of one embodiment of the present invention.
Figure 3B:
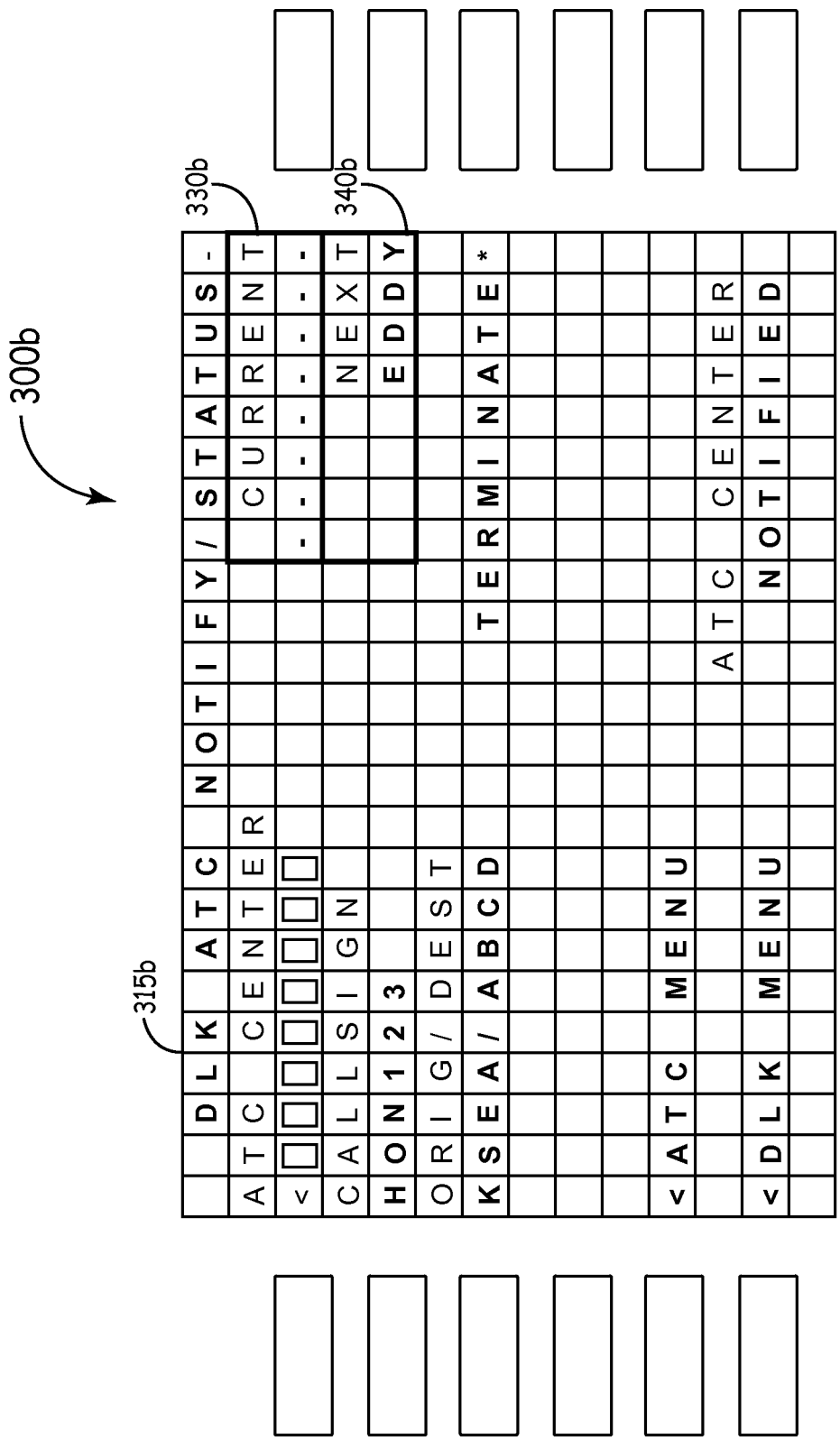
Figure 3C:
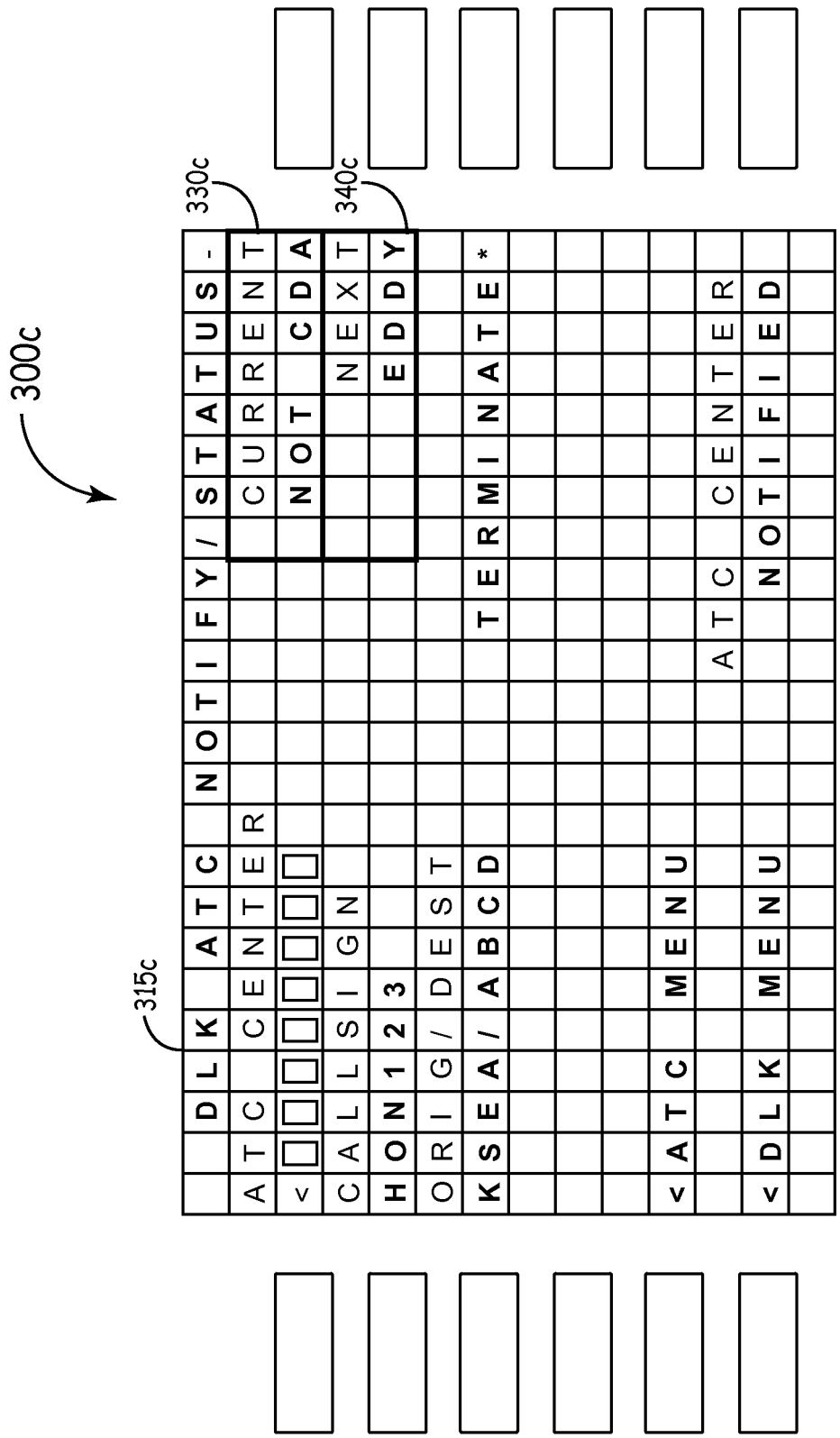

FIGS. 3A-3C are examples of display screens on Human Machine Interface 130 that indicate to a user whether a CPDLC session through a CPDLC application is the data authority application. A user, such as a flight crew member, can view status screens from the CPDLC applications on the display device 132. Display device 132 receives the screens from the respective CPDLC applications. For example, display device 132 receives status screens of the FANS CPDLC session from FANS CPDLC application 114 and status screens of the ATN CPDLC session from ATN CPDLC application 124. In certain embodiments, the status screens indicate whether a CPDLC application is a data authority application or a stand-by data authority application.

FIG. 3A illustrates (generally at 300a) a display screen 315a that indicates the status of a CPDLC application that is communicating with the current data authority. In display screen 315a, a current data authority field is shown at 330a. The current data authority field 330a in display screen 315a indicates to the flight crew user that the CPDLC application associated with the status screen shown on display screen 315a is the data authority application, and that the data authority application communicates with the current data authority EDYY. Further, a next data authority field 340a instructs the flight crew as to the data authority application that will be established if the CPDLC session with the current data authority were to end.

Conversely, FIGS. 3B-3C illustrate (generally at 300b and 300c) display screens 315b and 315c that display the status of a CPDLC application that is not communicating with the current data authority. In FIG. 3B, display screen 315b indicates to a user that the CPDLC application associated with the status screen is the stand-by data authority application by not displaying a status message of the stand-by data authority. In display screen 315b, a current data authority field, shown at 330b, is blank. The blank current data authority field 330b indicates to a user that the CPDLC application represented by the display screen is not the data authority application. Further, display screen 315b includes a next data authority field 340b, which informs a user that a CPDLC session has been established between the stand-by data authority application and an air traffic controller. For example, next data authority field 340b informs a user that the associated CPDLC application represented by the status screen has established a CPDLC session with the air traffic control center EDYY and no other NEXT ATC center connection has been established with the current data application. Thus, if the link between the data authority application and the current data authority application were to end, the air traffic controller center EDYY would become the current data authority.

In another embodiment, FIG. 3C illustrates a status screen that expressly indicates to a user that the associated CPDLC application is not communicating with the current data authority and that the CPDLC application is the stand-by data authority application. For example, display screen 315*c* includes a current data authority field 330*c*. When the CPDLC application associated with the screen is the stand-by data authority application, current data authority field 330*c* expressly indicates to a user that the associated CPDLC application is not communicating with the current data authority by displaying "NOT CDA" to a user. In other implementations, current data authority field 330*c* displays other messages that explicitly state that the associated CPDLC application is the stand-by data authority application. Similar to the screen shown in FIG. 3B, display screen 315*c* includes a next data authority field 340*c*, which informs a user that a CPDLC session has been established between the stand-by data authority application and an air traffic controller. For example, next data authority field 340*c* informs a user that the associated CPDLC application represented by the status screen has established a CPDLC session with the air traffic control center EDYY. Thus, if the link between the data authority application and the current data authority application were to end and there was not another NDA connection, the air traffic controller center EDYY would become the current data authority.

Figure 4:
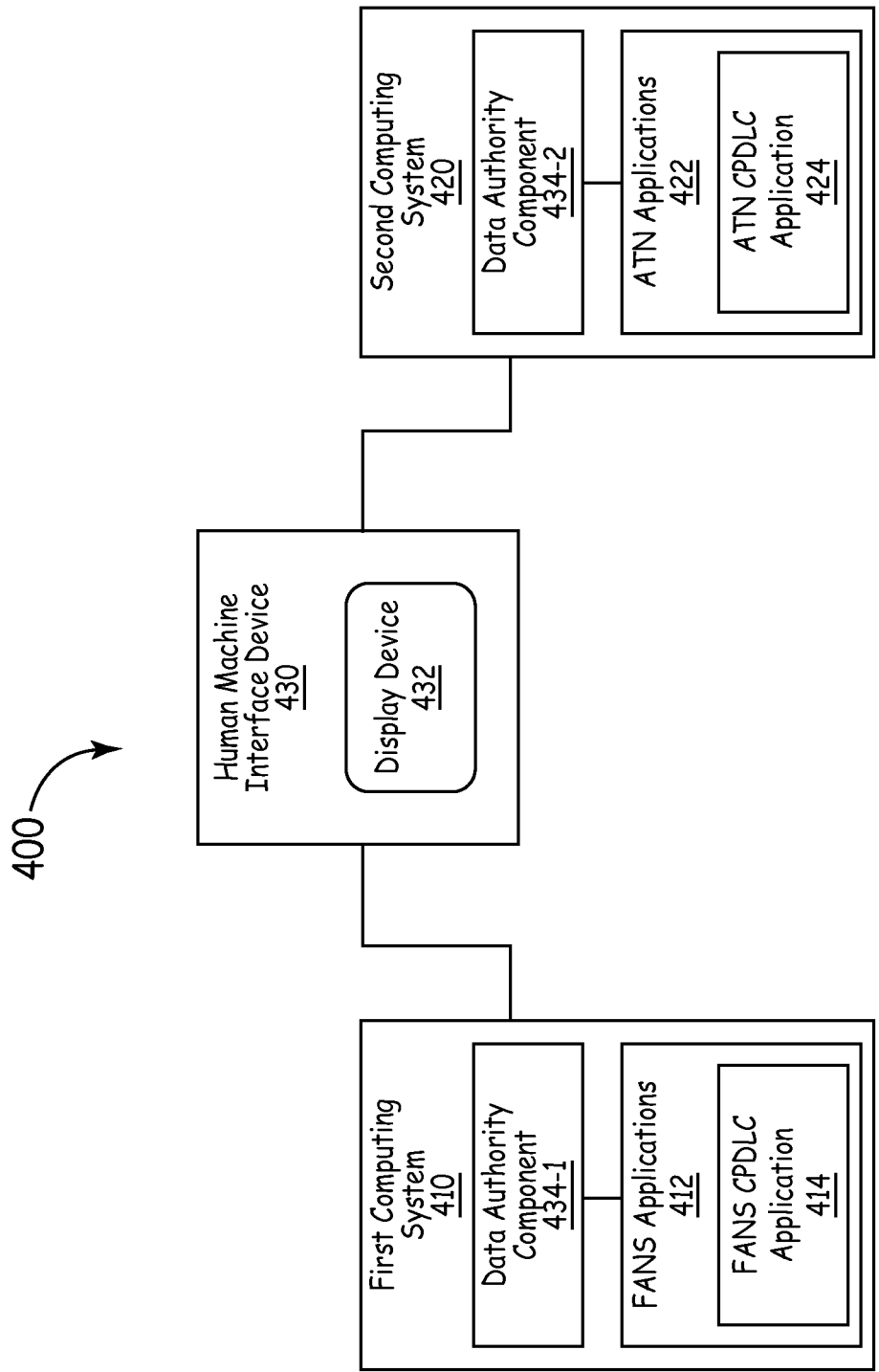
FIG. 4 is a block diagram of a system for implementing another non-integrated FANS/ATN CPDLC solution of one embodiment of the present invention.

FIG. 4 is a block diagram of a system 400 for implementing a non-integrated FANS/ATN CPDLC solution of one embodiment of the present invention. System 400 comprises a first computing system 410 for executing one or more FANS applications 412 including a FANS CPDLC application 414, a second computing system 420 for executing one or more ATN applications 422 including an ATN CPDLC application 424, and at least one Human Machine Interface (HMI) 430 coupled to the first computing system 410 and the second computing system 420. In one or more alternate embodiments, the FANS functions of the first computing system may be implemented by the aircraft's FMC, FMS, CMF, or CMU. Similarly, in at least one embodiment, the ATN functions of the second computing system would be implemented by the aircraft's CMF.

Human Machine Interface 430 provides a common display device 432 to present screens generated by the FANS and ATN CPDLC applications 414 and 424 to the aircraft's flight crew. In one embodiment, Human Machine Interface 430 includes a Multifunction Display (MFD) which is a forward field graphical display device that graphically displays screens to the flight crew and provides a cursor controlled interface to flight crew users. In one embodiment, Human Machine Interface 430 comprises a Control Display Unit (CDU) 210 such as described with respect to FIG. 2 above.

Unlike the embodiment of FIG. 1, the data authority function (shown generally at 434-1 and 434-2) does not reside on Human Machine Interface 430 but is instead distributed between the first computing system 410 and the second computing system 420. Such a configuration would be appropriate where, for example, HMI 430 is a "dumb" display terminal lacking processing capabilities (for example, like some MCDU) or otherwise includes only limited processing capabilities. In this case, each of the distributed data authority components 434-1 and 434-2 determine whether the respective computing system 410, 420 is the data authority application.

Distributed data authority components 434-1 and 434-2 communicate with one another to determine which ATC center is the current data authority and which CPDLC application is the data authority application. In one implementation, the first CPDLC application to establish a session with an ATC center is designated as the data authority application. Further, the data authority component 434-1 or 434-2 associated with the data authority application notifies the data authority component 434-1 or 434-2 associated with the stand-by data authority application that a current data authority session is established. For example, when FANS applications n establishes a current data authority session, data authority component 434-1 communicates with data authority component 434-2 on the second computing system 420 to indicate that a current data authority session is established. When ATN applications 422 establishes a CPDLC session with an ATC center, data authority component 434-2, having received a notification from data authority component 434-1 that a current data authority session is already established, designates ATN applications 422 as a stand-by data authority application.

Sometimes, both FANS applications 412 and ATN applications 422 attempt to establish current data authority sessions at the same time. To prevent the two CPDLC applications from establishing two concurrent current data authority sessions, data authority components 434-1 and 434-2 perform logic to assure that only one ATC center is designated as the current data authority. In one implementation, one CPDLC application has priority over the other CPDLC application. For example, where FANS applications 412 has priority over ATN applications 422, if FANS applications 412 and ATN applications 422 concurrently attempt to establish current data authority sessions, data authority components 434-1 and 434-2 communicate with one another and designate the ATC associated with the FANS application as the current data authority. Further, data authority component 434-2 will prevent ATN applications 422 from establishing a current data authority session as described above in regards to system 100. In an alternative implementation, where two CPDLC applications attempt to establish concurrent current data authority sessions, data authority components 434-1 and 434-2 use factors such as link characteristics, user preferences, region, and performance abilities when determining which CPDLC application will establish the current data authority session.

Figure 5:
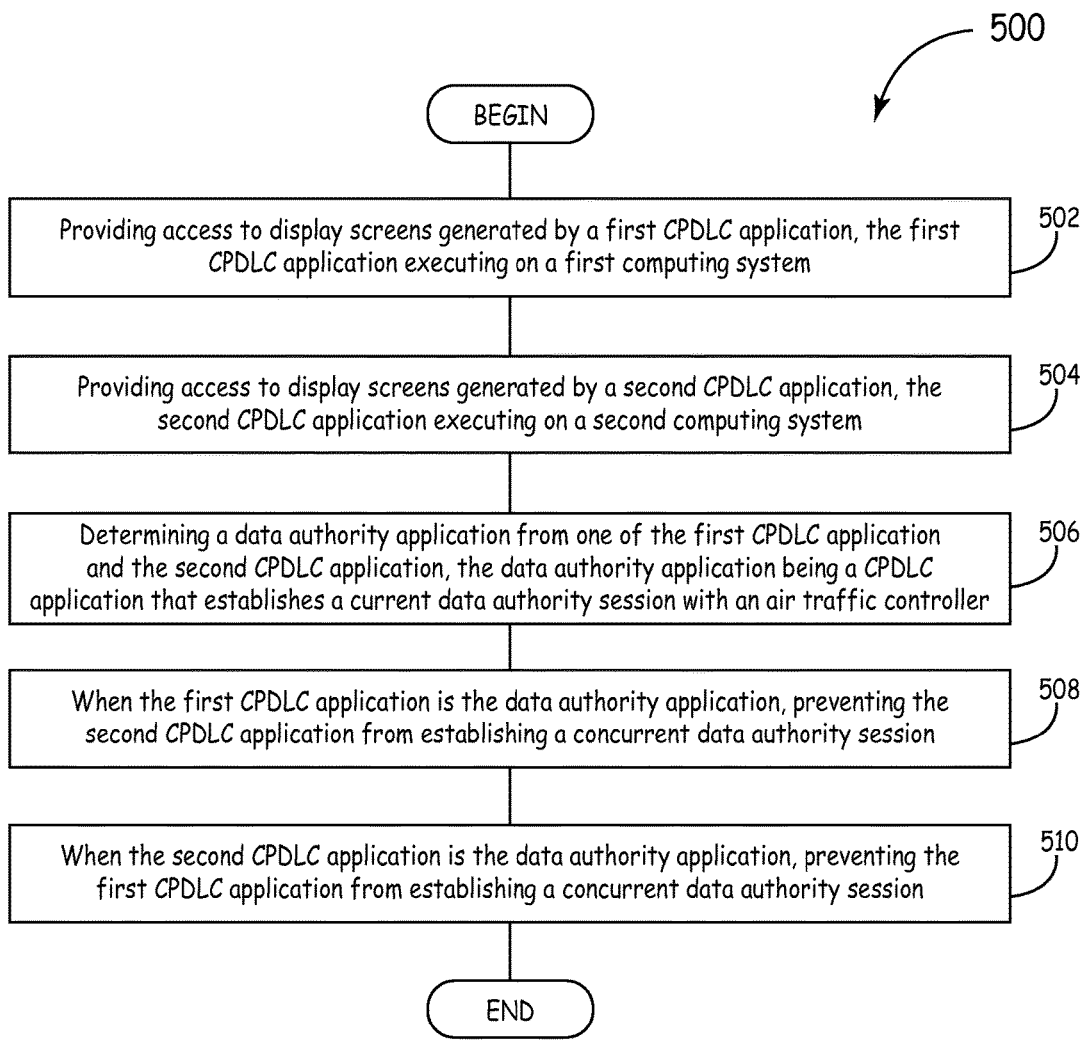
FIG. 5 is a flow chart illustrating a method of one embodiment of the present invention.

FIG. 5 is a flow chart illustrating a method for implementing a non-integrated FANS/ATN CPDLC solution of one embodiment of the present invention. The method begins at 502 with providing access to display screens generated by a first CPDLC application, the first CPDLC application executing on a first computing system. The method proceeds at 504 with providing access to display screens generated by a second CPDLC application, the second CPDLC application executing on a second computing system. For example, in one embodiment, the first CPDLC application is a FANS CPDLC application and the second CPDLC application is an ATN CPDLC application. A data authority function determines that a user has logged n to both the FANS application and the ATN application. The method proceeds at 506 with determining a data authority application from one of the first CPDLC application and the second CPDLC application, the data authority application being a CPDLC application that establishes a current data authority session with an air traffic controller. The data authority function designates one of the CPDLC applications as a data authority application to limit the system to only one current data authority session. When the first CPDLC application is the data authority application, the method proceeds at 508 with preventing second CPDLC application from establishing a concurrent current data authority session. When the second CPDLC application is the data authority application, the method proceeds at 510 with preventing the first CPDLC application from establishing a concurrent current data authority session. The data authority function limits the functionality of the CPDLC application that is the stand-by data authority application to prevent the establishment of more than one concurrent current data authority sessions.

Although the embodiments discussed above provide examples utilizing FANS and ATN CPDLC applications running over ACARS and ATN networks, embodiments of the present invention are not limited to just these two CPDLC and network options. For example, an air traffic control center can establish CPDLC sessions over an IP network. Further, HMI arbitration between any multiple computing systems used to implement separate CPDLC solutions can be realized by one of ordinary skill in the art using the teachings provided by this specification.

Several means are available to implement the systems and methods of the current invention as discussed in this specification. These means include, but are not limited to, digital computer systems, microprocessors, general purpose computers, programmable controllers and field programmable gate arrays (FPGAs) or application-specific integrated circuits (ASICs). Therefore other embodiments of the present invention are program instructions resident on computer readable media which when implemented by such means enable them to implement embodiments of the present invention. Computer readable media include any form of a physical computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended to cover any adaptations or variations of the present invention. Therefore, it is manifestly intended that this invention be limited only by the claims and the equivalents thereof.

What is claimed is:

1. A system for implementing a controller pilot data link communication (CPDLC) solution, the system comprising:
a first computing system executing a first CPDLC application, the first CPDLC application having established a first CPDLC session with a first air traffic controller;
a second computing system executing a second CPDLC application separately from the first CPDLC application, the second CPDLC application having established a second CPDLC session with a second air traffic controller, the second CPDLC session being concurrent with the first CPDLC session;
at least one Human Machine Interface coupled to the first computing system and the second computing system, the Human Machine Interface providing access to display screens generated by both the first CPDLC application and the second CPDLC application; and
a data authority function that designates the first CPDLC application as a data authority application, the data authority function indicates to the first CPDLC application that the established first CPDLC session is a current data authority session;
wherein, when the first computing system and the second computing system have established concurrent first and second CPDLC sessions, the data authority function prevents the second CPDLC application from establishing a concurrent current data authority session when the first CPDLC application is the data authority application;
wherein, in response to the second CPDLC application receiving an unsolicited first message from the second air traffic controller while the second air traffic controller incorrectly assumes that it is a current data authority, the data authority function directs the second CPDLC application to transmit a second message to the second air traffic controller indicating that the second air traffic controller is not the current data authority.

2. The system of claim 1, wherein the first CPDLC application comprises a future air navigation system (FANS) application
or an aeronautical telecommunication network (ATN) application, wherein the second CPDLC application comprises a FANS application or an ATN application.

3. The system of claim 1, wherein the data authority function is executed within the Human Machine Interface.

4. The system of claim 1, wherein the data authority function is a distributed function having a first component executed by the first computing system and a second component executed by the second computing system.

5. The system of claim 4, wherein the first component communicates with the second component.

6. The system of claim 1, wherein the data authority function designates the data authority application by receiving a user selection through the Human Machine Interface.

7. The system of claim 6, wherein the Human Machine Interface indicates to a user that the second CPDLC application is not the data authority application by displaying a notification page indicating that the second air traffic controller is not a current data authority.

8. The system of claim 1, wherein the data authority function prevents the second CPDLC application from establishing the concurrent current data authority session by performing at least one of:
while the second CPDLC application is not the data authority application, preventing the second CPDLC application from sending other messages to the second air traffic controller; and
when the second CPDLC application is not the data authority application, providing data to the Human Machine Interface to indicate to a user that the second CPDLC application is not the data authority application.

9. The system of claim 1, wherein, following transmission of the second message to the second air traffic controller, the data authority function designates the second CPDLC authority application as the data authority application when the first CPDLC session ends, wherein the data authority function allows the second CPDLC application to send downlink messages while the second CPDLC application is the data authority application.

10. A computer implemented method for implementing a controller pilot data link communication (CPDLC) solution, the method comprising:
providing access to display screens generated by a first CPDLC application, the first CPDLC application executing on a first computing system, the first CPDLC application having established a first CPDLC session with a first air traffic controller;

providing access to display screens generated by a second CPDLC application, the second CPDLC application executing on a second computing system separately from the first CPDLC application, the second CPDLC application having established a second CPDLC session with a second air traffic controller, the second CPDLC session being concurrent with the first CPDLC session;

designating first CPDLC application as a data authority application, the data authority application being a CPDLC application that establishes a current data authority session with a data authority, wherein the data authority function indicates to the first CPDLC application that the established first CPDLC session is a current data authority session;

when the first CPDLC application is the data authority application and the first computing system and the second computing system have established the concurrent first and second CPDLC sessions, preventing the second CPDLC application from establishing a concurrent current data authority session; and wherein, in response to the second CPDLC application receiving an unsolicited first message from the second air traffic controller while the second air traffic controller incorrectly assumes that it is a current data authority, the data authority function directs the second CPDLC application to transmit a second message to the second air traffic controller indicating that the second air traffic controller is not the current data authority.

11. The method of claim 10, wherein the first CPDLC application comprises a future air navigation system (FANS) application
or an aeronautical telecommunication network (ATN) application, wherein the second CPDLC application comprises a FANS application or an ATN application.

12. The method of claim 10, wherein the data authority function is a distributed function having a first component executed by the first computing system and a second component executed by the second computing system.

13. The method of claim 10, wherein preventing the second CPDLC application from establishing the current data authority session comprises:

while the second CPDLC application is not the data authority application, preventing a user from communicating with the second air traffic controller through the second CPDLC application;

when the second CPDLC application is not the data authority application, providing data to a Human Machine Interface to display to a user that the second CPDLC application is not the data authority application.

14. The method of claim 13, wherein the Human Machine Interface indicates to a user that the second air traffic controller is not the current data authority by displaying on a notification page an indication that the second air traffic controller is not the current data authority.

15. The method of claim 10, further comprising:
following transmission of the second message to the second air traffic controller, determining that the first CPDLC session between the first CPDLC application and the first air traffic controller ended;

designating the second CPDLC application as the data authority application, wherein the data authority function allows the second CPDLC application to send downlink messages while the second CPDLC application is the data authority application.

16. A non-transitory computer readable data storage device having computer executable code for a data authority function that controls the functionality of a first controller pilot data link communication (CPDLC) application and a second CPDLC application, the method comprising:

providing access to display screens generated by a first CPDLC session through a first CPDLC application, the first CPDLC application executing on a first computing system, the first CPDLC application having established a first CPDLC session with a first air traffic controller;

providing access to display screens generated by a second CPDLC session through a second CPDLC application, the second CPDLC application executing on a second computing system separately from the first CPDLC application, the second CPDLC application having established a second CPDLC session with a second air traffic controller, the second CPDLC session being concurrent with the first CPDLC session;

designating the first CPDLC application as a data authority application, the data authority application being a CPDLC application that communicates with a Current Data Authority (CDA), wherein the data authority function indicates to the first CPDLC application that the established first CPDLC session is a current data authority session;

when the first CPDLC application is the data authority application and the first computing system and the second computing system have established the concurrent first and second CPDLC sessions, preventing the second CPDLC application from establishing a concurrent current data authority session; and wherein, in response to the second CPDLC application receiving an unsolicited first message from the second air traffic controller while the second air traffic controller incorrectly assumes that it is the CDA, the data authority function directs the second CPDLC application to transmit a second message to the second air traffic controller indicating that the second air traffic controller is not the CDA.

17. The computer readable data storage device of claim 16, wherein the data authority function is a distributed function having a first component executed by the first computing system and a second component executed by the second computing system.

18. The system of claim 1, wherein, while the first CPDLC application is the current data authority, the data authority function allows a user to view the screens generated by the second CPDLC application but prevents the user from using the screens generated by the second CPDLC application to send commands through the second CPDLC application.

* * * * *

UNITED STATES PATENT AND TRADEMARK OFFICE
CERTIFICATE OF CORRECTION

PATENT NO. : 10,102,754 B2
APPLICATION NO. : 13/268284
DATED : October 16, 2018
INVENTOR(S) : Judd et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 48 days.

Signed and Sealed this
Thirtieth Day of July, 2019

Andrei Iancu
*Director of the United States Patent and Trademark Office*